United States Patent
Bonch-Osmolovsky

(10) Patent No.: US 10,803,337 B2
(45) Date of Patent: *Oct. 13, 2020

(54) SYSTEMS AND METHODS FOR RECOGNIZING SYMBOLS IN IMAGES

(71) Applicant: INTELLIGENT SECURITY SYSTEMS CORPORATION, Woodbridge, NJ (US)

(72) Inventor: Alexander Bonch-Osmolovsky, Moscow (RU)

(73) Assignee: Intelligent Security Systems Corporation, Woodbridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,083

(22) Filed: Apr. 22, 2019

(65) Prior Publication Data

US 2019/0244044 A1    Aug. 8, 2019

Related U.S. Application Data

(63) Continuation of application No. 15/933,172, filed on Mar. 22, 2018, now Pat. No. 10,275,674, which is a
(Continued)

(51) Int. Cl.
*G06K 9/46* (2006.01)
*G06K 9/18* (2006.01)
(Continued)

(52) U.S. Cl.
CPC ............. *G06K 9/18* (2013.01); *G06K 9/4604* (2013.01); *G06K 9/6202* (2013.01); *G06T 7/11* (2017.01); *G06T 7/12* (2017.01)

(58) Field of Classification Search
CPC ........ G06K 9/18; G06K 2209/01; G06K 9/78; G06K 9/6255; G06K 9/6202; G06K 9/00288; G06K 9/00402; G06K 9/00422; G06K 9/00577; G06T 7/11; G06T 2207/30176; H04N 1/00326; H04N 1/00331; H04N 1/0036
See application file for complete search history.

(56) References Cited

U.S. PATENT DOCUMENTS

| | | |
|---|---|---|
| 5,539,840 A | 7/1996 | Krtolica et al. |
| 5,933,525 A | 8/1999 | Makhoul et al. |

(Continued)

*Primary Examiner* — Amara Abdi
(74) *Attorney, Agent, or Firm* — Dentons US LLP

(57) ABSTRACT

A computer-implemented method comprises generating a description of a character symbol from a binarized image; comparing a template for the character symbol with the description of the character symbol based on a reference description, wherein the template comprises a grid of cells, a set of local features which may be present in the grid of cells, the reference description specifying which member of the set of local features should be present or absent in the grid of cells, and a threshold of an accepted deviation with the description of the character symbol; assigning a penalty value to the description of the character symbol via a cost function when a discrepancy exists based on the comparing; selecting the template as a match candidate for the character symbol when the penalty value is below the threshold; recognizing the character symbol based on the selecting.

20 Claims, 6 Drawing Sheets

Related U.S. Application Data continuation of application No. 15/702,149, filed on Sep. 12, 2017, now Pat. No. 9,946,946, which is a continuation of application No. 15/094,472, filed on Apr. 8, 2016, now Pat. No. 9,946,945.

(51) Int. Cl.
*G06K 9/62* (2006.01)
*G06T 7/12* (2017.01)
*G06T 7/11* (2017.01)

(56) References Cited

U.S. PATENT DOCUMENTS

| | | | |
|---|---|---|---|
| 6,125,206 A * | 9/2000 | Yokota | G06K 9/6807 |
| | | | 382/189 |
| 6,259,814 B1 * | 7/2001 | Krtolica | G06K 9/4609 |
| | | | 382/205 |
| 8,761,514 B2 | 6/2014 | Park et al. | |
| 9,946,945 B2 | 4/2018 | Bonch-Osmolovsky | |
| 9,946,946 B1 | 4/2018 | Bonch-Osmolovsky | |
| 2002/0114523 A1 | 8/2002 | Filatov et al. | |
| 2009/0060335 A1 | 3/2009 | Rodriguez Serrano et al. | |
| 2013/0077856 A1 * | 3/2013 | Ferro | G06K 9/6255 |
| | | | 382/159 |
| 2014/0023274 A1 | 1/2014 | Barman et al. | |
| 2014/0023278 A1 * | 1/2014 | Krishna Kumar | G06K 9/4647 |
| | | | 382/192 |
| 2014/0180670 A1 | 6/2014 | Osipova | |
| 2014/0185106 A1 * | 7/2014 | Nakamura | G06K 9/348 |
| | | | 358/462 |
| 2015/0379341 A1 * | 12/2015 | Agrawal | G06K 9/00483 |
| | | | 382/176 |
| 2017/0293817 A1 | 10/2017 | Bonch-Osmolovsky | |

* cited by examiner

200

202

204

SYSTEMS AND METHODS FOR RECOGNIZING SYMBOLS IN IMAGES

CROSS-REFERENCE TO RELATED APPLICATIONS

This application is a continuation of U.S. patent application Ser. No. 15/933,172, filed on Mar. 22, 2018, which is a continuation of U.S. patent application Ser. No. 15/702,149, filed on Sep. 12, 2017, which is a continuation of U.S. patent application Ser. No. 15/094,472, filed on Apr. 8, 2016, all of which are herein fully incorporated by reference for all purposes.

TECHNICAL FIELD

Generally, the present disclosure relates image processing.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned with. Further, nothing is disclaimed.

An image is captured via an image capture device, such as a camera. Often, the image contains information, such as an alphanumerical string, which is desired to be extracted for processing, such as license plate recognition. Typically, such information is extracted via an optical character recognition (OCR) process, which involves a pre-processing phase, a character recognition phase, and a post-processing phase. Although the character recognition phase is fairly developed, the character recognition phase is still not sufficiently precise in character recognition. Therefore, there is a desire to improve the character recognition phase.

SUMMARY

The present disclosure at least partially addresses at least one of the above. However, the present disclosure can prove useful to other technical areas. Therefore, the claims should not be construed as necessarily limited to addressing any of the above.

In an embodiment, a method of character recognition comprises: generating, by a computer, a description of a character symbol from a binarized image; comparing, by the computer, a template for the character symbol with the description of the character symbol based on a reference description, wherein the template comprises a grid of cells, a set of local features which may be present in the grid of cells, the reference description specifying which member of the set of local features should be present or absent in the grid of cells, and a threshold of an accepted deviation with the description of the character symbol; assigning, by the computer, a penalty value to the description of the character symbol via a cost function when a discrepancy exists based on the comparing; selecting, by the computer, the template as a match candidate for the character symbol when the penalty value is below the threshold; recognizing, by the computer, the character symbol based on the selecting.

In an embodiment, a device comprises a computer configured to: generate a description of a character symbol from a binarized image; compare a template for the character symbol with the description of the character symbol based on a reference description, wherein the template comprises a grid of cells, a set of local features which may be present in the grid of cells, the reference description specifying which member of the set of local features should be present or absent in the grid of cells, and a threshold of an accepted deviation with the description of the character symbol; assign a penalty value to the description of the character symbol via a cost function when a discrepancy exists based on the comparing; select the template as a match candidate for the character symbol when the penalty value is below the threshold; recognize the character symbol based on the selecting.

Additional features and advantages of various embodiments are set forth in the description which follows, and in part is apparent from the description. Various objectives and other advantages of the present disclosure are realized and attained by various structures particularly pointed out in the exemplary embodiments in the written description and claims hereof as well as the appended drawings. It is to be understood that both the foregoing general description and the following detailed description are exemplary and explanatory and are intended to provide further explanation of the present disclosure as claimed.

BRIEF DESCRIPTION OF DRAWINGS

The accompanying drawings constitute a part of this specification and illustrate an embodiment of the present disclosure and together with the specification, explain the present disclosure.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art.

Figure 1:
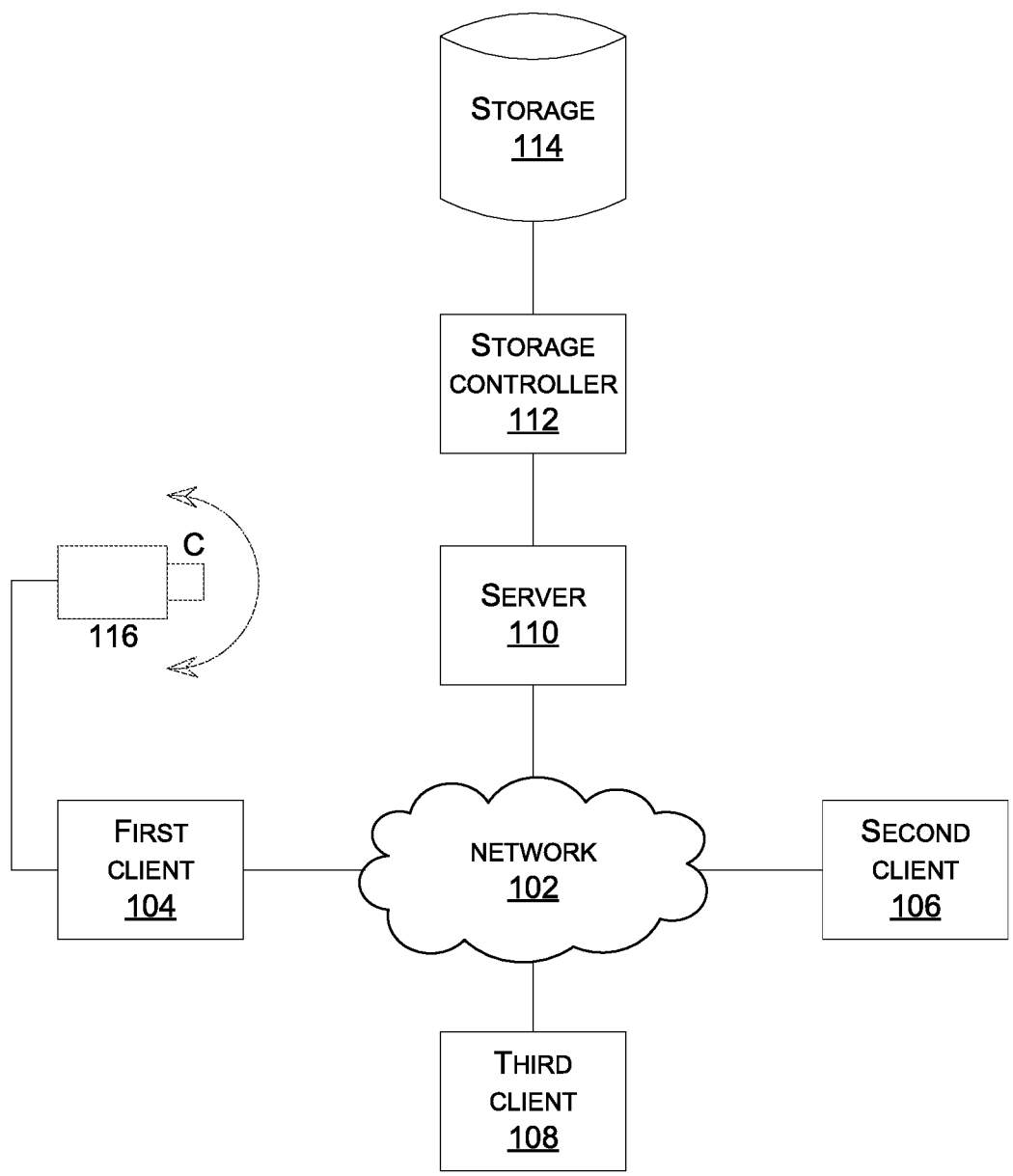
FIG. 1 shows a schematic view of an embodiment of a network topology according to the present disclosure.

FIG. 1 shows a schematic view of an embodiment of a network topology according to the present disclosure. A network topology 100 comprises a network 102, a first client 104, a second client 106, a third client 108, a server 110, a data storage controller 112, a data storage 114, and a camera 116. All components of the topology 100 can be coupled directly or indirectly, whether in a wired or a wireless manner. Note that each of components of the topology 100 can be implemented in logic, whether hardware-based or software-based. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component. Further, note that at least one of such components can be implemented as a service. Moreover, note that at least two of such components can be hosted on one computing system/hardware/device or each be distinctly hosted.

The topology 100 is based on a distributed network operation model which allocates tasks/workloads between servers, which provide a resource/service, and clients, which request the resource/service. The servers and the clients illustrate different computers/applications, but in some embodiments, the servers and the clients reside in or are one system/application. Further, in some embodiments, the topology 100 entails allocating a large number of resources to a small number of computers, such as the server 110, where complexity of the clients, such as the clients 104, 106, 108, depends on how much computation is offloaded to the small number of computers, i.e., more computation offloaded from the clients onto the servers leads to lighter clients, such as being more reliant on network sources and less reliant on local computing resources. Note that other computing models are possible as well. For example, such models can comprise decentralized computing, such as peer-to-peer (P2P), for instance Bit-Torrent®, or distributed computing, such as via a computer cluster where a set of networked computers works together such that the computer can be viewed as a single system.

The network 102 includes a plurality of nodes, such as a collection of computers and/or other hardware interconnected via a plurality of communication channels, which allow for sharing of resources and/or information. Such interconnection can be direct and/or indirect. The network 102 can be wired and/or wireless. The network 102 can allow for communication over short and/or long distances, whether encrypted and/or unencrypted. The network 102 can operate via at least one network protocol, such as Ethernet, a Transmission Control Protocol (TCP)/Internet Protocol (IP), and so forth. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, and so forth. The network 102 can be and/or include an intranet and/or an extranet. The network 102 can be and/or include Internet. The network 102 can include other networks and/or allow for communication with other networks, whether sub-networks and/or distinct networks, whether identical and/or different from the network 102 in structure or operation. The network 102 can include hardware, such as a computer, a network interface card, a repeater, a hub, a bridge, a switch, an extender, an antenna, and/or a firewall, whether hardware based and/or software based. The network 102 can be operated, directly and/or indirectly, by and/or on behalf of one and/or more entities or actors, irrespective of any relation to contents of the present disclosure.

The server 110 can be hardware-based and/or software-based. The server 110 is and/or is hosted on, whether directly and/or indirectly, a server computer, whether stationary or mobile, such as a kiosk, a workstation, a vehicle, whether land, marine, or aerial, a desktop, a laptop, a tablet, a mobile phone, a mainframe, a supercomputer, a server farm, and so forth. The server computer can comprise another computer system and/or a cloud computing network. The server computer can run any type of operating system (OS), such as MacOS®, Windows®, Android®, Unix®, Linux® and/or others. The server computer can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The server computer can include and/or be coupled to, whether directly and/or indirectly, an output device, such as a display, a speaker, a headphone, a vibrator, a printer, or any other suitable output device. In some embodiments, the input device and the output device can be embodied in one unit, such as a touch-enabled display, which can be haptic. The server computer can include circuitry, such as a receiver chip, for geolocation/global positioning determination, such as via a global positioning system (GPS), a signal triangulation system, and so forth. The server computer can be equipped with near-field-communication (NFC) circuitry, such as an NFC chip. The server computer can host, run, and/or be coupled to, whether directly and/or indirectly, a database, such as a relational database or a non-relational database, such as a post-relational database, an in-memory database, or others, which can feed, avail, or otherwise provide data to at least one of the server 110, whether directly and/or indirectly. The server 110 can be at least one of a network server, an application server, or a database server.

The server 110, via the server computer, can be in communication with the network 102, such as directly and/or indirectly, selectively and/or unselectively, encrypted and/or unencrypted, wired and/or wireless. Such communication can be via a software application, a software module, a mobile app, a browser, a browser extension, an OS, and/or any combination thereof. For example, such communication can be via a common framework/application programming interface (API), such as Hypertext Transfer Protocol Secure (HTTPS).

At least one of the clients 104, 106, 108 can be hardware-based and/or software-based. At least one of the clients 104, 106, 108 is and/or is hosted on, whether directly and/or indirectly, a client computer, whether stationary or mobile, such as a terminal, a kiosk, a workstation, a vehicle, whether land, marine, or aerial, a desktop, a laptop, a tablet, a mobile phone, a mainframe, a supercomputer, a server farm, and so forth. The client computer can comprise another computer system and/or cloud computing network. The client computer can run any type of OS, such as MacOS®, Windows®, Android®, Unix®, Linux® and/or others. The client computer can include and/or be coupled to an input device, such as a mouse, a keyboard, a camera, whether forward-facing and/or back-facing, an accelerometer, a touchscreen, a biometric reader, a clicker, a microphone, or any other suitable input device. The client computer can include and/or be coupled to an output device, such as a display, a speaker, a headphone, a joystick, a vibrator, a printer, or any other suitable output device. In some embodiments, the input device and the output device can be embodied in one unit, such as a touch-enabled display, which can be haptic. The client computer can include circuitry, such as a receiver chip, for geolocation/global positioning determination, such as via a GPS, a signal triangulation system, and so forth. The client computer can be equipped with NFC circuitry, such as an NFC chip. The client computer can host, run and/or be coupled to, whether directly and/or indirectly, a database, such as a relational database or a non-relational database, such as a post-relational database, an in-memory database, or others, which can feed or otherwise provide data to at least one of the clients 104, 106, 108, whether directly and/or indirectly.

At least one of the clients 104, 106, 108, via the client computer, is in communication with network 102, such as directly and/or indirectly, selectively and/or unselectively, encrypted and/or unencrypted, wired and/or wireless, via contact and/or contactless. Such communication can be via a software application, a software module, a mobile app, a browser, a browser extension, an OS, and/or any combination thereof. For example, such communication can be via a common framework/API, such as HTTPS. In some embodiments, the server 110 and at least one of the clients 104, 106, 108 can also directly communicate with each other, such as when hosted in one system or when in local proximity to each other, such as via a short range wireless communication protocol, such as infrared or Bluetooth®. Such direct communication can be selective and/or unselective, encrypted and/or unencrypted, wired and/or wireless, via contact and/or contactless. Since many of the clients 104, 106, 108 can initiate sessions with the server 110 relatively simultaneously, in some embodiments, the server 110 employs load-balancing technologies and/or failover technologies for operational efficiency, continuity, and/or redundancy.

The storage controller 112 can comprise a device which manages a disk drive or other storage, such as flash storage, and presents the disk drive as a logical unit for subsequent access, such as various data input/output (IO) operations, including reading, writing, editing, deleting, updating, searching, selecting, merging, sorting, or others. The storage controller 112 can include a front-end side interface to interface with a host adapter of a server and a back-end side interface to interface with a controlled disk storage. The front-end side interface and the back-end side interface can use a common protocol or different protocols. Also, the storage controller 112 can comprise an enterprise controller, which can comprise a physically independent enclosure, such as a disk array of a storage area network or a network-attached storage server. For example, the storage controller 112 can comprise a redundant array of independent disks (RAID) controller. In some embodiments, the storage controller 112 can be lacking such that a storage can be directly accessed by the server 110. In some embodiments, the controller 222 can be unitary with the server 110.

The storage 114 can comprise a storage medium, such as at least one of a data structure, a data repository, a data mart, or a data store. For example, the storage medium comprises a database, such as a relational database, a non-relational database, an in-memory database, or others, which can store data and allow access to such data to the storage controller 112, whether directly and/or indirectly, whether in a raw state, a formatted state, an organized stated, or any other accessible state. For example, the data can comprise image data, sound data, alphanumeric data, or any other data. For example, the storage 114 can comprise a database server. The storage 114 can comprise any type of storage, such as primary storage, secondary storage, tertiary storage, off-line storage, volatile storage, non-volatile storage, semiconductor storage, magnetic storage, optical storage, flash storage, hard disk drive storage, floppy disk drive, magnetic tape, or other data storage medium. The storage 114 is configured for various data I/O operations, including reading, writing, editing, modifying, deleting, updating, searching, selecting, merging, sorting, encrypting, de-duplicating, or others. In some embodiments, the storage 114 can be unitary with the storage controller 112. In some embodiments, the storage 114 can be unitary with the server 110.

The camera 116 comprises an optical instrument for capturing and recording images, which may be stored locally, transmitted to another location, or both. The images may be individual still photographs or sequences of images constituting videos. The images can be analog or digital. The camera 116 can comprise any type of lens, such as convex, concave, fisheye, or others. The camera 116 can comprise any focal length, such as wide angle or standard. The camera 116 can comprise a flash illumination output device. The camera 116 can comprise an infrared illumination output device. The camera 116 can is powered via mains electricity, such as via a power cable or a data cable. In some embodiments, the camera 116 is powered via at least one of an onboard rechargeable battery, such as a lithium-ion battery, or an onboard renewable energy source, such as a photovoltaic cell, a wind turbine, or a hydropower turbine. The camera 116 is coupled to the first client 104, whether directly or indirectly, whether in a wired or wireless manner. For example, the client 104 can power the camera 116. The camera 116 can be configured for geotagging, such as via modifying an image file with geolocation/coordinates data. The camera 116 can be front or rear facing, if the client 104 is a mobile device, such as a smartphone, a tablet, or a laptop. The camera 116 can include or be coupled to a microphone. The camera 116 can be a pan-tilt-zoom camera.

In one mode of operation, the camera 116 sends a captured image to the client 104, which then sends the image to the server 110 over the network 102. The server 110 stores the image in the storage 114 via the storage controller 112. The second client 106 can comprise a manager terminal in signal communication with the server 110 over the network 102 to manage the server 110 over the network 102. The third client 108 can comprise a customer terminal in signal communication with the server 110 to access the image over the network 102, as captured via the camera 116 and stored in the storage 114 via the storage controller 112. The manager terminal can comprise a plurality of input/output devices, such as a keyboard, a mouse, a speaker, a display, a printer, a camera, or others, with the manager terminal being embodied as a tablet computer, a laptop computer, or a workstation computer, where the display can output a graphical user interface (GUI) configured to input or to output information, whether alphanumerical, symbolical, or graphical, to a manager operating the manager terminal. The input can include various management information for managing the server 110 and the output can include a status of the server 110, the storage controller 112, or the storage 114. The manager terminal can be configured to communicate with other components of the topology 100 over the network 102 for management or maintenance purposes, such as to program, update, modify, or adjust any server, controller, computer, or storage in the topology 100. The GUI can also be configured to present other management or non-management information as well. The manager terminal can be configured to print reports, such as in color or grayscale.

Note that any computing device as described herein comprises at least a processing unit and a memory unit operably coupled to the processing unit. The processing unit comprises a hardware processor, such as a single core or a multicore processor. For example, the processing unit 102 comprises a central processing unit (CPU), which can comprise a plurality of cores for parallel/concurrent independent processing. The memory unit comprises a computer-readable storage medium, which can be non-transitory. The storage medium stores a plurality of computer-readable instructions for execution via the processing unit. The instructions instruct the processing unit to facilitate performance of a method for recognizing a symbol in an image, as disclosed herein. For example, the processing unit and the memory unit can enable various file or data input/output operations, including reading, writing, editing, modifying, deleting, updating, searching, selecting, merging, sorting, encrypting, de-duplicating, or others. The memory unit can comprise at least one of a volatile memory unit, such as random access memory (RAM) unit, or a non-volatile memory unit, such as an electrically addressed memory unit or a mechanically addressed memory unit. For example, the electrically addressed memory comprises a flash memory unit. For example, the mechanically addressed memory unit comprises a hard disk drive. The memory unit can comprise a storage medium, such as at least one of a data repository, a data mart, or a data store. For example, the storage medium can comprise a database, such as a relational database, a non-relational database, an in-memory database, or other suitable databases, which can store data and allow access to such data via a storage controller, whether directly and/or indirectly, whether in a raw state, a formatted state, an organized stated, or any other accessible state. The memory unit can comprise any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Figure 2:
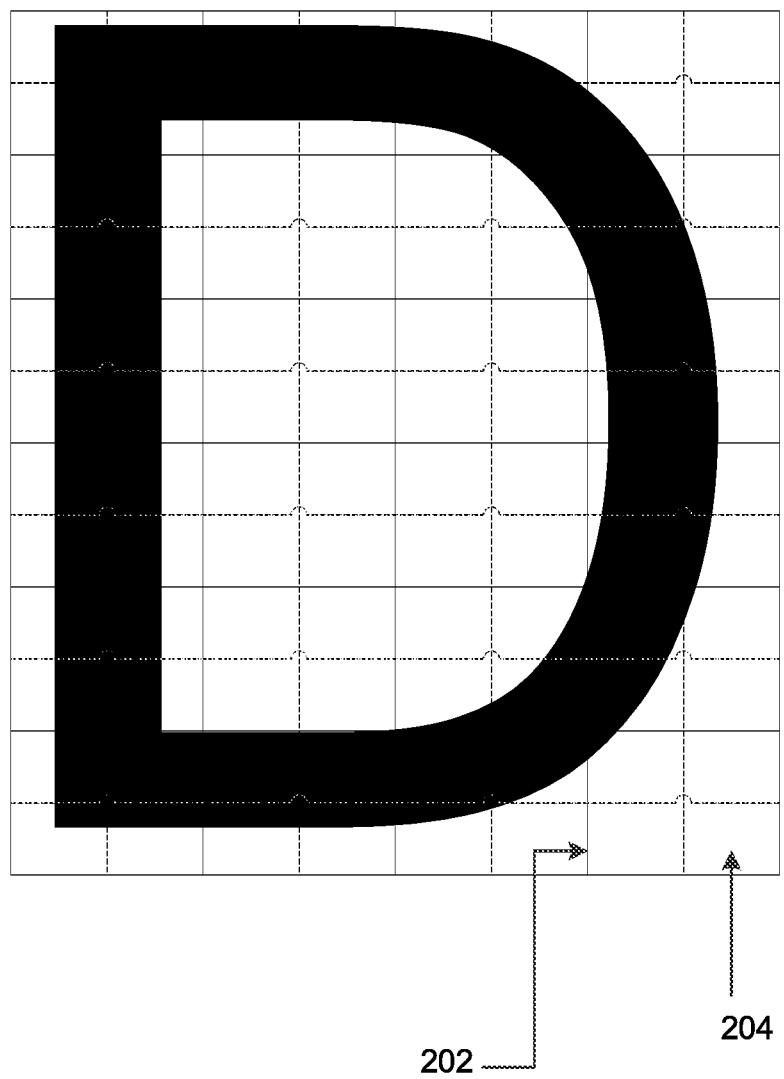
FIG. 2 shows a schematic view of a bounding box broken into a grid of cells according to the present disclosure.

FIG. 2 shows a schematic view of a bounding box broken into a grid of cells according to the present disclosure. A bounding box 200 is segmented into a predetermined number of cells 202, along a vertical plane and a horizontal plane. Each of the cells 202 is indicated by solid lines. Each of the cells 202 contains a plurality of pixels 204. The pixels 204 are indicated by broken lines. As shown in FIG. 2, the bounding box 200 comprises four cells 202 extending consecutively along a horizontal axis and six cells 202 extending consecutively along a vertical axis, with each of the cells 202 containing four pixels 204 in an unshared manner. Note that a number of pixels 204 per cell 202 can vary. For example, the number of pixels 204 can depend on how the bounding box 200 is divided into the cells 204. Further, note that although letter D is shown in the bounding box 200, any symbol, such as alphanumeric, of any alphabet/library can be used, such as O, Q, A, E, I, G, S, 2, 4, 7, 3, 8, 0, or others.

Note that the bounding box 200 can be shaped in any closed shape, such as a rectangle, a square, a triangle, or any other closed shape. For example, the bounding box 200 can comprise more cells 202 along the vertical axis than the horizontal axis, such as via a vertically rectangular shape. The cells 202 can be shaped in any closed shape, such as a rectangle, a square, a triangle, or any other closed shape. For example, the cells 202 can enable tiling (or paving) an entire area of the bounding box 200 in a rectangular or a square fashion. The cells 202 can be identical to or different from each other in shape or size. The cells 202 can total to an even or an odd amount. A ratio of a number of cells 202 by height (the vertical axis) and width (the horizontal axis) substantially corresponds to a typical ratio of a recognizable font, which in FIG. 2 is Arial.

Although each of the cells 202 contains four pixels 204, any amount of pixels 204 can be contained in a single cell 202, such as 2×2 pixels, 4×6 pixels, 6×5 pixels, or others. In some embodiments, at least two cells 202 differ in amount of pixels 204 therein, such as one cell 202 having 6 pixels and another cell 202 having 8 pixels.

Figure 3:
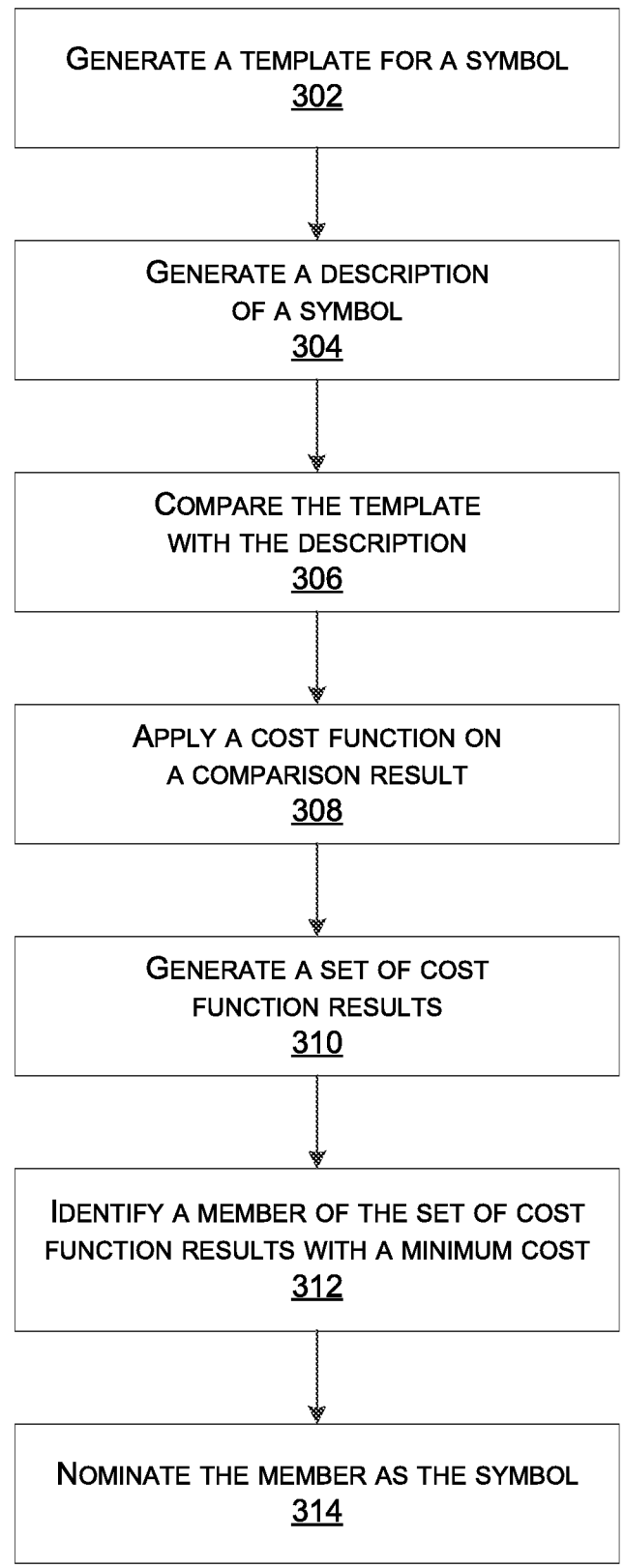
FIG. 3 shows a flowchart of an embodiment of a process for recognizing a symbol in an image according to the present disclosure.

FIG. 3 shows a flowchart of an embodiment of a process for recognizing a symbol in an image according to the present disclosure. A process 300 includes a plurality of blocks 302-314. The process 300 is performed via a computer architecture of FIG. 1. In some embodiments, the process 300 is distributed over a plurality of computers. The process 300 enables a recognition of a symbol via a binary image thereof. For example, an image is camera-captured or machine-generated. The image comprises the symbol. The image can be monochrome, grayscale, or color. The image can be a still-photo or a portion of a video, such as a single frame. The image is pre-processed, such as de-skewed, de-speckled, binarized, segmented, normalized, or pre-processed in any other way. Upon binarization of the image, such as via a grayscale threshold application process or otherwise, a binary image is generated, where the binary image comprises a digital image, which comprises a plurality of pixels, where each of the pixels comprises two possible values. For example, the binary image can be a black and white image, where 1 represents black and 0 represents white. However, note that any two colors can be used, such as red represented by 1 and green represented by 0. A color used for the symbol in the binary image is a foreground color, such as black, while a non-colored area is a background color, such as white.

The symbol is representative of a glyph, such as a printed block type or a non-cursive character, in any font, such as Arial, or size, such as 12 as used in Microsoft Word®. For example, the symbol can be alphanumeric and comprise a letter Z or x, such as contained in a license plate or a document page. However, note that the symbol representative of the glyph can be a portion of any type of writing system/alphabet in any font in any size, such as Latin, Cyrillic, Hebrew, Indic, Bengali (Bangla), Devanagari, Tamil characters of any font or size. For example, the writing system/alphabet of a language can be used, where the writing system/alphabet includes characters which are roughly of similar vertical size. Further, although the process 300 is scale invariant, in some embodiments, the process 300 can be scale variant.

In a block 302, a template for a symbol is generated. The template comprises an appearance variant of the symbol. Such generation can occur for a plurality of symbols as well. For example, a set of templates for a set of symbols can be generated. Note that more than one template can be generated per symbol, such as for a letter Z there can be more than one template, such as one for each font. For example, one or more templates can be generated in a stage preceding an actual recognition stage.

Such template generation can occur via segmenting a bounding box into a predetermined number of cells, along a vertical plane and a horizontal plane. For example, the bounding box can contain a grid of cells. The bounding box is sized to contain the appearance variant therein. The bounding box can be shaped in any closed shape, such as a rectangle, a square, a triangle, or any other closed shape. For example, the bounding box can comprise more cells along the vertical axis than the horizontal axis, such as via a rectangular shape. The cells can be shaped in any closed shape, such as a rectangle, a square, a triangle, or any other closed shape. The cells can be identical to or different from each other in shape. The cells can total to an even or an odd amount. A ratio of a number of cells by height (the vertical axis) and width (the horizontal axis) substantially corresponds to a typical ratio of a recognizable font symbol. Each of the cells contains a plurality of pixels, where the pixels are not shared with other cells. For example, at least one of the cells can contain 2×2 pixels, 4×6 pixels, 6×5 pixels, or others.

Upon segmenting the bounding box into the cells, one or more local features are specified, where such local features may be present in at least one of the cells. For example, the local features can comprise horizontal/vertical/diagonal lines, edges, corners, blobs, stroke aspects, boundaries, contour directions, concavities/convexities, or any other local image characteristics which enable location of local image structures in a repeatable manner. For example, one or more local features are specified in a set. For example, one or more local features can be specified via a reference, a pointer, or an identifier, such as an alphanumeric symbol, a symbol string, a memory location, or others.

Upon specifying the local features, for each appearance variant of writing/typing/depicting the symbol, a reference description is generated, where for each local feature specified in the set of one or more local features, one or more of the cells is specified which should contain or not contain that respective local feature. For example, such functionality can be performed via marking of important pixels for each local feature.

The reference description comprises two sets of tables, such as matrices based on a number of local features selected for analysis. For example, a plurality of matrices can be generated based on a number of selected local features for analysis. The first set is a mask set and the second set is a pattern set. Each of the first set and the second set comprises a same number of cells as segmented in the bounding box. In each of the first set and the second set, each local feature is represented via its own table. Therefore, the first set and the second set are related on at least a cell basis.

In the mask set, each table indicates or specifies cells in which presence or absence of a respective local feature appears meaningful for recognition (important for location matching—which cells should be and should not be considered during a candidate comparison). This appearance is indicated by a value, such as a binary value, for instance 1. However, remaining table cells are populated with a 0 value, if binary system is used. Correspondingly, for that same local feature, the pattern set indicates whether or not a given local feature should be present in a given cell of a symbol being analyzed (important for feature presence). Therefore, a value of a table in a cell can be immaterial for symbol recognition unless a value of the corresponding mask table is one (1).

For each generated reference description, a threshold is set or assigned, where the threshold corresponds to a degree of an acceptable deviance with a generated description of a recognizable symbol. Such threshold can be a value defined as a maximum number of cells where the deviation was noted. For example, if a reference description deviates over 5% with a description of a recognizable symbol, then that reference description can be rejected, as not corresponding to the recognizable symbol. The threshold is determined based on appropriate presence or absence of selected local features in mask selected cells of the bounding box, where the threshold corresponds to a number or percentage of cells meeting or not meeting a certain criteria.

Accordingly, such information can be populated into a template or a template can be generated based on such information. For example, the template can be stored in a file or a record, either of which can be stored in a database.

In a block 304, a description of a symbol is generated. The symbol is in an image subject to pre-processing. Such description can be generated based on placing a bounding box over a symbol such that the symbol is contained in the box. The bounding box is broken up into a predetermined number of cells, which is equivalent to the reference description, noted above. For each pixel of each cell, a determination of a presence or an absence of a selected local feature is performed. Then, for each cell, based on the same rule, a determination is performed, where the determination determines an absence or a presence of each of these local features based on the presence of such features in individual pixels included in that cell. However, note that any type or kind of rules can be used in any combinatory or permutational manner, as user preset or dynamically set. For example, if one pixel in a cell has a local feature, then the cell can be imputed to possess this local feature. For example, if all pixels in a cell have a local feature, then the whole cell can be imputed to possess this local feature. However, note that any intermediate pixel configurations can also be used, such as one half of pixels in a cell or two thirds of pixels in a cell or three quarters of pixels in a cell or any other fractions. Likewise, a pixel pattern can also be rule-based, such as pixels being continuous in a cell or pixels being arranged in a certain shape in a cell or pixels positioned along an edge of a cell or any others.

In a block 306, the template is compared with the description of the symbol. Such comparison comprises comparing the reference description of each variant of each symbol with the description of the symbol, as noted above. For each local feature of the reference description and for each cell, where the description of the symbol mandates the presence or the absence of that local feature, a check for the presence or the absence of this feature in the description of the symbol is performed. Note that a full vector of a presence of a local feature in a cell can be used, where the full vector is generated for each analyzed local feature. Further, note that, for example, since the template can indicate a maximum allowable difference or deviance from a description of a symbol, a recognition result can be absent.

In a block 308, a cost function is applied to a result of the comparison of the template with the description of the symbol. In case of discrepancy, based on the checking noted above, a cost, such as a penalty, is incurred, where all accrued costs are totaled, such as via summing differences for each local feature. If the accrued costs for all local features exceed the threshold, as set in the reference description, then that symbolic variant is rejected as a result of recognition. For example, the cost function is evaluated on a cell-by-cell basis. For example, the cost function can be based on a Hemming distance. For example, the Hemming distance can be used to determine difference between the template and the description of the symbol.

In a block 310, a set of cost function results is generated. The set of cost function results is based on non-rejected symbolic variants, i.e., reference descriptions.

In a block 312, a member of the set of cost function results is identified, wherein the member is associated with a minimum cost. Note that more than one member can be identified. Such identification occurs based on sorting the set based on cost, such as from low to high or high to low, such as via a sorting algorithm, such as an insertion sort, a selection sort, a merge sort, a heap sort, a quick sort, a bubble sort, a shell sort, a comb sort, a counting sort, a bucket sort, a radix sort, or any other sort. Upon sorting, the member associated with the minimum cost is identified. Then, as a result of a character recognition phase, one or more reference descriptions or variants with minimum costs are selected to correspond to the symbol. In some embodiments, all remaining reference descriptions or variants are provided, yet under a condition, such as limiting to a number of output symbol matches, such as 5 matches, or discarding or ignoring those remaining reference descriptions or variants that have a cost clearly greater than others.

In a block 314, the member(s) with the minimum cost are nominated for character recognition, i.e., one or more reference descriptions or variants with minimum costs are output for corresponding to the symbol.

In some embodiments, the process 300 is performed on a per symbol basis and therefore, for example, can be used to distinguish a symbol O from a symbol D or a symbol O from a symbol Q. However, note that the process 300 can be configured for performance on a per word basis, for each symbol contained therein.

In some embodiments, the process 300 is tweaked for a specific application, such as for license plate or vehicle identifier recognition, whether at lane location in real-time or on a deferred basis. However, note that other applications are possible as well, such as document processing or others. For example, in license plate recognition, such tweaking can comprise developing character templates for a particular typeface to be recognized, like the one on license plates of a jurisdiction at hand.

In some embodiments, a matrix matching character recognition process or a feature extraction character recognition process comprises the process 300.

Figure 4:
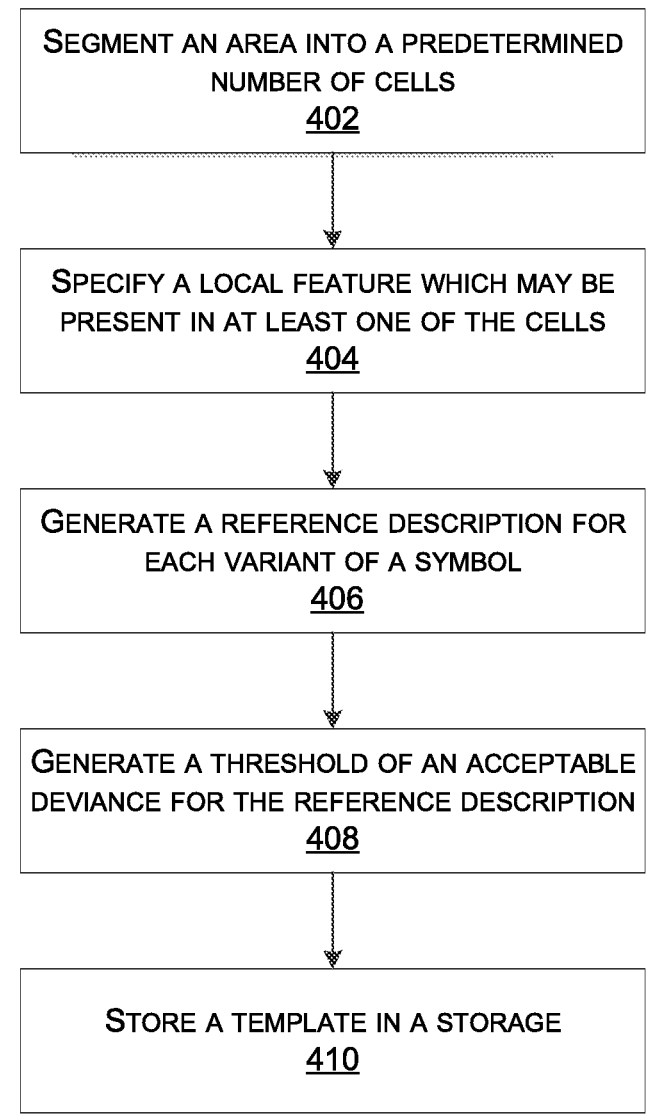
FIG. 4 shows a flowchart of an embodiment of a process for generating a template according to the present disclosure.

FIG. 4 shows a flowchart of an embodiment of a process for generating a template according to the present disclosure. A process 400 includes a plurality of blocks 402-410. The process 400 is performed via a computer architecture of FIG. 1. In some embodiments, the process 400 is distributed over a computer architecture of FIG. 1.

In a block 402, an area is segmented into a predetermined number of cells. Such segmentation can occur based on a template for a symbol being generated. The template reflects an appearance variant of the symbol. Such generation can occur for a plurality of symbols as well. For example, a set of templates for a set of symbols can be generated. Note that more than one template can be generated per symbol, such as for a letter W there can be more than one template, such as one for each font. The segmentation involves segmenting a bounding box into a predetermined number of cells, along a vertical plane and a horizontal plane. For example, the bounding box can contain a grid of cells. For example, the bounding box can be rectangularly tessellated. The bounding box is sized to contain the appearance variant therein. The bounding box can be shaped in any closed shape, such as a rectangle, a square, a triangle, or any other closed shape. For example, the bounding box can comprise more cells along the vertical axis than the horizontal axis, such as via a rectangular shape. The cells can be shaped in any closed shape, such as a rectangle, a square, a triangle, or any other closed shape. The cells can be identical to or different from each other in shape. The cells can total to an even or an odd amount. A ratio of a number of cells by height (the vertical axis) and width (the horizontal axis) substantially corresponds to a typical ratio of a recognizable font. Each of the cells contains a plurality of pixels, where the pixels are not shared with other cells. For example, at least one of the cells can contain 2×2 pixels, 4×6 pixels, 6×5 pixels, or others.

In a block 404, a local feature is specified, where the local feature may be present in at least one of the cells. Such specification occurs based upon segmenting the bounding box into the cells, where one or more local features are specified, where such local features may be present in at least one of the cells. For example, a variety of local features can be selected prior to template generation, based on available image analysis machinery or based on an appearance of font glyphs. For example, the local features can comprise horizontal/vertical/diagonal lines, edges, corners, stroke aspects, boundaries, direction, orientations, contours, concavities/convexities, or any other local image characteristics which enable location of local image structures in a repeatable manner. For example, one or more local features are specified in a set.

In a block 406, a reference description for each variant of a symbol is generated. Such generation occurs based upon specifying the local features, for each appearance variant of writing/typing/depicting the symbol, a reference description is generated, where for each local feature specified in the set of one or more local features, one or more of the cells is specified which should contain or not contain that respective local feature. For example, such functionality allows marking of important cells for each local feature.

The reference description comprises two sets of tables, such as matrices based on a number of local features selected for analysis. For example, a plurality of matrices can be generated based on a number of selected local features for analysis. The first set is a mask set and the second set is a pattern set. Each matrix or table of the first set and the second set comprises a same number of cells as segmented in the bounding box. In each of the first set and the second set, each local feature is represented via its own respective table. Therefore, the first set and the second set are related on at least a cell basis.

In the mask set, each table specifies cells in which presence or absence of a respective local feature appears meaningful for recognition (which cells should be and should not be considered during a candidate comparison). This appearance is indicated by a value, such as a binary value, for instance 1. However, remaining table cells are populated with a 0 value, if binary system is used. Correspondingly, for that same local feature, the pattern set indicates whether or not a given local feature should be present in a given cell of a symbol being analyzed (important for feature presence). Therefore, a value of a pattern table in a cell can be immaterial for symbol recognition unless a value of the corresponding mask table is one (1).

In a block 408, a threshold of an acceptable deviance for the reference description is generated. Such generation occurs for each generated reference description, where the threshold is set or assigned, where the threshold corresponds to a degree of an acceptable deviance with a generated description of a recognizable symbol. Such threshold can be a value defined as a maximum number of cells where the deviation was noted. For example, if a reference description deviates over 5% with a description of a recognizable symbol, then that reference description can be rejected, as not corresponding to the recognizable symbol. The threshold is determined based on appropriate presence or absence of selected local features in selected cells of the bounding box, where the threshold corresponds to a number or percentage of cells meeting or not meeting a certain criteria, such as defined via a deviation gauging method based on counting a number of deviant cells over all features.

In a block 410, a template is stored in a storage. The template can be a file or a record, populated or generated, as noted above.

Figure 5:
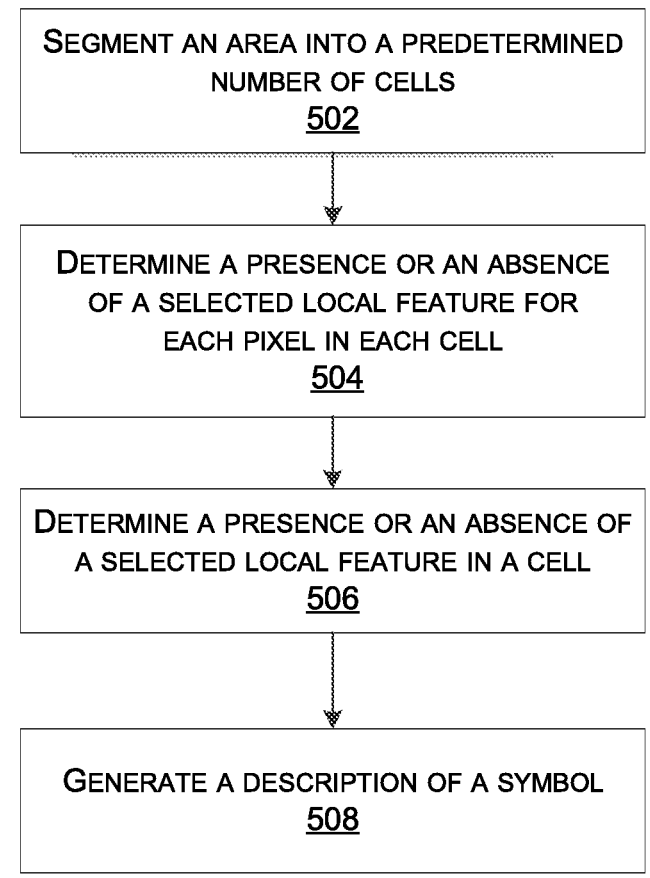
FIG. 5 shows a flowchart of an embodiment of a process for generating a description of a symbol according to the present disclosure.

FIG. 5 shows a flowchart of an embodiment of a process for generating a description of a symbol according to the present disclosure. A process 500 includes a plurality of blocks 502-508. The process 500 is performed via a computer architecture of FIG. 1. In some embodiments, the process 500 is distributed over a computer architecture of FIG. 1.

In a block 502, an area is segmented into a predetermined number of cells. The symbol is in an image that has been subject to pre-processing. Such description can be generated based on placing a bounding box over a symbol such that the symbol is contained in the box. The bounding box is broken up into a predetermined number of cells, which is equivalent to the reference description, noted above.

In a block 504, a presence or an absence of a selected local feature for each pixel in each cell is determined. For example, for each pixel of each cell, a determination of a presence or an absence of a selected local feature is performed. For example, such determination can comprise calculating a cell state with respect to the local features. In some embodiments, a pixel pattern can also be rule-based, such as pixels being continuous in a cell or pixels being arranged in a certain shape in a cell or pixels positioned along an edge of a cell or any others.

In a block 506, a presence or an absence of a selected local feature in a cell is determined. For example, for each cell, based on the same rule, a determination is performed, where the determination determines an absence or a presence of each of these local features based on the presence of such features in individual pixels included in that cell. However, note that any type or kind of rules can be used in any combinatory or permutational manner, as user preset or dynamically set. For example, if one pixel in a cell has a local feature, then the cell can be imputed to possess this local feature. For example, if all pixels in a cell have a local feature, then the whole cell can be imputed to possess this local feature. However, note that any intermediate pixel configurations can also be used, such as one half of pixels in a cell or two thirds of pixels in a cell or three quarters of pixels in a cell or any other fractions. Further, note that any combinatory or permutational combination of such rules can be used.

In a block 508, a description of a symbol is generated. Such description can be a file or a record, populated or generated, as noted above. In some embodiments, at least one of the blocks 502-508 can be performed for each feature in the selected set of local features, which will yield the description of the character in hand.

Figure 6:
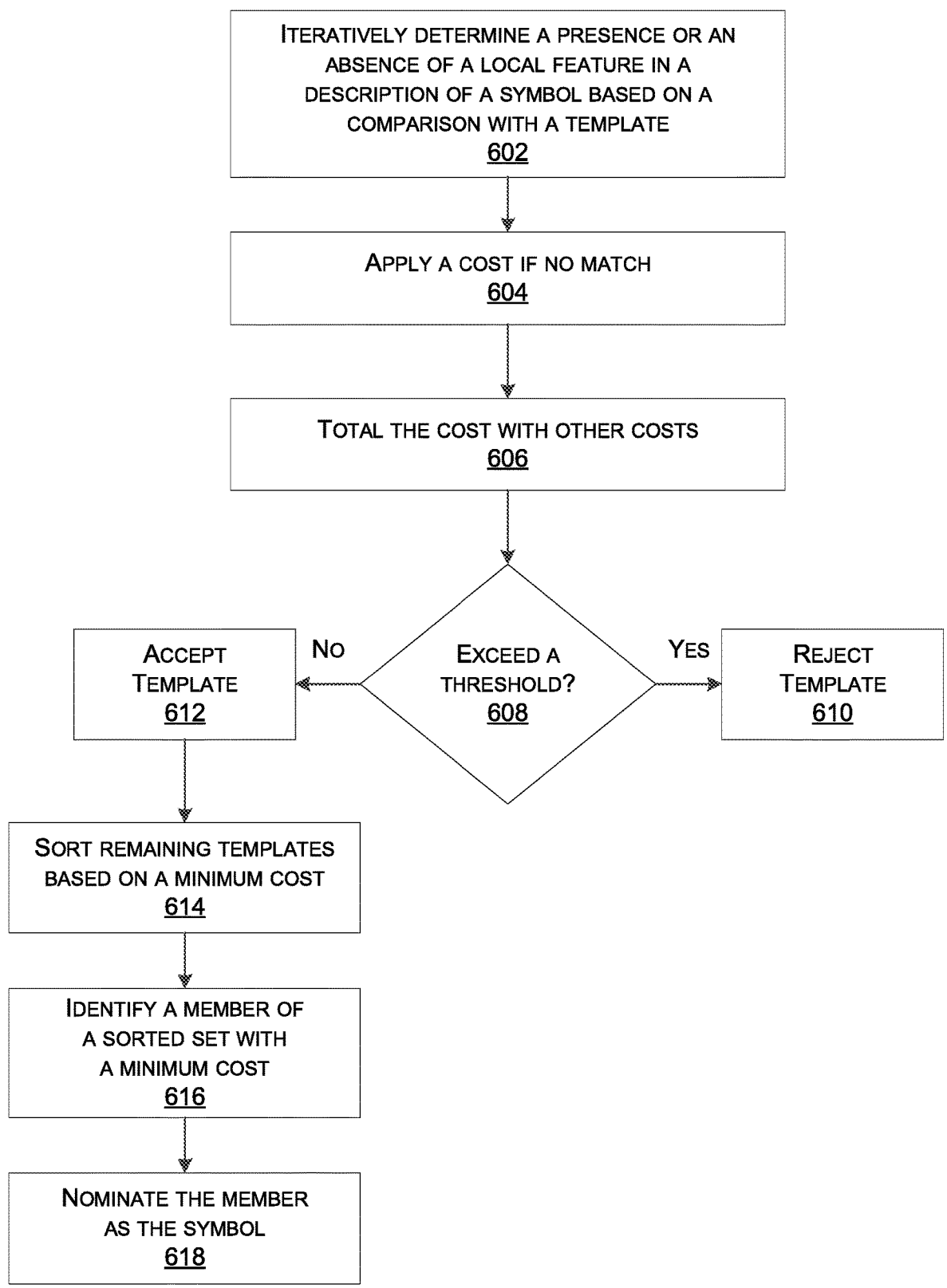
FIG. 6 shows a flowchart of an embodiment of a process for selecting a template corresponding to a symbol according to the present disclosure.

FIG. 6 shows a flowchart of an embodiment of a process for selecting a template corresponding to a symbol according to the present disclosure. A process 600 includes a plurality of blocks 602-618. The process 600 is performed via a computer architecture of FIG. 1. In some embodiments, the process 600 is distributed over a plurality of computers. The process 600 is employed based on comparing the template with the description of the symbol, as noted above. Such comparison comprises comparing the reference description of each variant of each symbol with the description of the symbol, as noted above.

In a block 602, a determination is made, where the determination determines a presence or an absence of a local feature in a description of symbol based on a comparison with a template. For example, such determination can comprise testing if the feature flag is set for the specific cell. For example, such determination can comprise iteration over cells. For each local feature of the reference description and for each cell, where the description of the symbol mandates the presence or the absence of that local feature, a check for the presence or the absence of this feature in the description of the symbol is performed. For example, a Hemming distance can be used to determine difference between the template and the description of the symbol. Note that a full vector of a presence of a local feature in one or more cells can be used, where the full vector is generated for each analyzed local feature. Further, note that, for example, since the template can indicate a maximum allowable difference or deviance from a description of a symbol, a recognition result can be absent.

In a block 604, a cost is applied if no match is found, such as via an application of a cost function. The cost function is applied to a result of the comparison of the template with the description of the symbol. In case of discrepancy, based on the checking noted above, the cost is incurred.

In a block 606, a totaling of the cost with other costs, if any, is performed. In case of discrepancy, based on the checking noted above, a cost is incurred, where all accrued costs are totaled, such as via summing differences for each local feature.

In a block 608, a determination is made, where the determination determines if a threshold has been exceeded. Note that vice versa configuration can be used as well, where the threshold has not been met. For example, the threshold can be exceeded or not met. If the threshold has been exceeded, a block 610 is performed. Otherwise, a block 612 is performed.

In the block 610, if the accrued costs for all local features exceed the threshold, as set in the reference description, then that symbolic variant is rejected as a result of recognition.

In the block 612, if the accrued costs for all local features do not exceed the threshold, as set in the reference description, then that symbolic variant is accepted as a possible candidate for a result of recognition. Eventually, a set of cost function results is formed. The set of cost function results is based on non-rejected symbolic variants, i.e., reference descriptions. Note that the blocks 602-612 describe a loop over most or all available templates. Therefore, the process 600 does not proceed further until the loop is completed and an examination of most or all available templates is complete.

In a block 614, a set of remaining templates is sorted based on cost, such as from low to high or high to low, such as via a sorting algorithm, such as an insertion sort, a selection sort, a merge sort, a heap sort, a quick sort, a bubble sort, a shell sort, a comb sort, a counting sort, a bucket sort, a radix sort, or any other sort.

In a block 616, a member of a sorted set is identified, with the member being associated with a minimum cost. For example, a member of a set of sorted cost function results is identified, wherein the member is associated with a minimum cost. Note that more than one member can be identified.

In a block 618, the member is nominated as the symbol. For example, as a result of a character recognition phase, one or more reference descriptions or variants with minimum costs are selected to correspond to the symbol. In some embodiments, all remaining reference descriptions or variants are provided, yet under a condition, such as limiting to a number of output symbol matches, such as 5 matches, or discarding or ignoring those remaining reference descriptions or variants that have a cost clearly greater than others. Further, the member(s) with the minimum cost is nominated for character recognition, i.e., one or more reference descriptions or variants with minimum costs are output for corresponding to the symbol.

In some embodiments, the process 300 can be performed, in whole or in part, by at least one of a desktop computer, a workstation computer, a laptop computer, a terminal computer, a tablet computer, a mobile phone, an eyewear computer, a vehicle computer, a server computer, a cloud-computing system, a mainframe, a supercomputer, or other suitable computers. In some embodiments, the vehicle computer is embodied as at least one of a ground vehicle computer, a marine vehicle computer, an aerial vehicle computer, or a space vehicle computer.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

What is claimed is:

1. A method comprising:
   in response to pre-processing, by a server, an image inclusive of a symbol, comparing, by the server, a template for the symbol with a description of the symbol, wherein the template comprises a grid of cells, a set of local features which may be present in the grid of cells, a reference description specifying which member of the set of local features should be present or absent in the grid of cells, and a threshold of an accepted deviation with the description of the symbol;

in response to assigning, by the server, a penalty value to the description of the symbol via a cost function based on a discrepancy existing between the template and the description of the symbol, selecting, by the server, the template as a match candidate for the symbol based on the penalty value satisfying the threshold; and recognizing, by the server, the symbol as the match candidate.

2. The method of claim 1, wherein the symbol is a glyph.

3. The method of claim 2, wherein the image shows a license plate, wherein the license plate includes the symbol.

4. The method of claim 1, wherein the reference description comprises a mask table set that specifies a cell in which a presence or an absence of a respective local feature is meaningful for recognition.

5. The method of claim 1, wherein the reference description comprises a pattern table set that indicates whether or not a given local feature should be present in a given cell of the symbol.

6. The method of claim 1, further comprising:
rejecting, by the server, the template as the match candidate for the symbol based on the penalty value not satisfying the threshold.

7. The method of claim 1, wherein the grid of cells is a first grid of cells, wherein the description of the symbol is based on:
segmenting, by the server, a bounding box into a second grid of cells, wherein the bounding box contains the symbol, wherein the first grid of cells corresponds to the second grid of cells, wherein the second grid of cells contains a plurality of pixels, each of the cells of the second grid of cells contains a set of pixels;
determining, by the server, for each of the pixels in the set of pixels of each of the cells of the second grid of cells, a presence or an absence of a local feature from the set of local features;
determining, by the server, for each of the cells of the second grid of cells, a presence or an absence of a local feature from the set of local features based on an application of a rule to an individual pixel included in that respective cell.

8. The method of claim 1, wherein the grid of cells is a first grid of cells, wherein the description of the symbol includes a second grid of cells corresponding to the first grid of cells, wherein the template and the description of the symbol are compared based on:
for each of the local features of the reference description which mandates a presence or an absence of a specified local feature and for each of the cells in the second grid of cells, verifying, by the server, the presence or the absence in the description of the symbol.

9. The method of claim 1, wherein the threshold is determined based on an appropriate presence or absence of a selected local feature in a selected cell of a bounding box, wherein the threshold corresponds to a number or percentage of cells meeting or not meeting a criterion.

10. The method of claim 1, wherein for each local feature of the reference description and for each cell, where the description of the symbol mandates a presence or an absence of that local feature, a check for the presence or the absence of this respective feature in the description of the symbol is performed.

11. A system comprising:
a server programmed to:
in response to pre-processing an image inclusive of a symbol, compare a template for the symbol with a description of the symbol, wherein the template comprises a grid of cells, a set of local features which may be present in the grid of cells, a reference description specifying which member of the set of local features should be present or absent in the grid of cells, and a threshold of an accepted deviation with the description of the symbol;
in response to assigning a penalty value to the description of the symbol via a cost function based on a discrepancy existing between the template and the description of the symbol, select the template as a match candidate for the symbol based on the penalty value satisfying the threshold;
recognize the symbol as the match candidate.

12. The system of claim 11, wherein the symbol is a glyph.

13. The system of claim 12, wherein the image shows a license plate, wherein the license plate includes the symbol.

14. The system of claim 11, wherein the reference description comprises a mask table set that specifies a cell in which a presence or an absence of a respective local feature is meaningful for recognition.

15. The system of claim 11, wherein the reference description comprises a pattern table set that indicates whether or not a given local feature should be present in a given cell of the symbol.

16. The system of claim 11, wherein the server is programmed to reject the template as the match candidate for the symbol based on the penalty value not satisfying the threshold.

17. The system of claim 11, wherein the grid of cells is a first grid of cells, wherein the description of the symbol is based on the server being programmed to:
segment a bounding box into a second grid of cells, wherein the bounding box contains the symbol, wherein the first grid of cells corresponds to the second grid of cells, wherein the second grid of cells contains a plurality of pixels, each of the cells of the second grid of cells contains a set of pixels;
determine for each of the pixels in the set of pixels of each of the cells of the second grid of cells, a presence or an absence of a local feature from the set of local features;
determine for each of the cells of the second grid of cells, a presence or an absence of a local feature from the set of local features based on an application of a rule to an individual pixel included in that respective cell.

18. The system of claim 11, wherein the grid of cells is a first grid of cells, wherein the description of the symbol includes a second grid of cells corresponding to the first grid of cells, wherein the template and the description of the symbol are compared based on the server being programmed to:
for each of the local features of the reference description which mandates a presence or an absence of a specified local feature and for each of the cells in the second grid of cells, verify the presence or the absence in the description of the symbol.

19. The system of claim 11, wherein the threshold is determined based on an appropriate presence or absence of a selected local feature in a selected cell of a bounding box, wherein the threshold corresponds to a number or percentage of cells meeting or not meeting a criterion.

20. The system of claim 11, wherein for each local feature of the reference description and for each cell, where the description of the symbol mandates a presence or an absence of that local feature, a check for the presence or the absence of this respective feature in the description of the symbol is performed.

\* \* \* \* \*